United States Patent [19]

Price et al.

[11] Patent Number: 5,649,092
[45] Date of Patent: Jul. 15, 1997

[54] FAULT TOLERANT APPARATUS AND METHOD FOR MAINTAINING ONE OR MORE QUEUES THAT ARE SHARED BY MULTIPLE PROCESSORS

[75] Inventors: Ferris T. Price, deceased, late of Mayer, by Robert Howe Price, legal representative; Eugene A. Rodi, Minneapolis; Marvin W. Theis, Plymouth, all of Minn.

[73] Assignee: Unisys Corporation, Blue Bell, Pa.

[21] Appl. No.: 583,765

[22] Filed: Jan. 11, 1996

Related U.S. Application Data

[63] Continuation of Ser. No. 230,961, Apr. 21, 1994, abandoned.

[51] Int. Cl.$^6$ ............................................. G06F 13/00
[52] U.S. Cl. ............................................. 395/182.13
[58] Field of Search .................. 395/181, 182.01, 395/182.02, 182.08, 182.09, 182.13, 182.17, 292, 375, 427, 474, 736, 859; 364/244, 244.3, 254.5, 268.9; 371/40.1, 48, 51.1

[56] References Cited

U.S. PATENT DOCUMENTS

| | | | |
|---|---|---|---|
| 4,473,880 | 9/1984 | Budde et al. | 364/200 |
| 4,807,111 | 2/1989 | Cohen et al. | 364/200 |
| 4,811,283 | 3/1989 | Gembarowski | 364/900 |
| 4,819,159 | 4/1989 | Shipley et al. | 365/200 |
| 5,006,982 | 4/1991 | Ebersole et al. | 364/200 |
| 5,023,776 | 6/1991 | Gregor | 364/200 |
| 5,027,269 | 6/1991 | Grant et al. | 364/200 |
| 5,050,066 | 9/1991 | Myers et al. | 364/200 |
| 5,095,421 | 3/1992 | Freund | 395/650 |
| 5,202,980 | 4/1993 | Morita et al. | 395/575 |
| 5,214,783 | 5/1993 | Lips et al. | 395/725 |
| 5,222,217 | 6/1993 | Blount et al. | 395/325 |
| 5,265,229 | 11/1993 | Sareen | 395/425 |
| 5,266,781 | 11/1993 | Warwick et al. | 235/375 |
| 5,291,589 | 3/1994 | Matsuura et al. | 395/182.13 |
| 5,333,269 | 7/1994 | Calvignac et al. | 395/200 |
| 5,386,554 | 1/1995 | Nozaki | 395/600 |
| 5,398,330 | 3/1995 | Johnson | 395/182.13 |

OTHER PUBLICATIONS

Stone, J.M., "A Simple and Correct Shared–Queue Algorithm Using Compare–And–Swap", Proced of Supercomputing '90, IEEE Computer Society Press, pp. 495–504, Nov. '90.

Lee et al., "DRISP: A Versatile Scheme for Distributed Fault-Tolerant Queues", 24 May 1991, 11th Intl. Conf. on Distributed Computing Sys., IEEE Press.

*Primary Examiner*—Robert W. Beausoliel, Jr.
*Assistant Examiner*—Stephen C. Elmore
*Attorney, Agent, or Firm*—Charles A. Johnson; Mark T. Starr

[57] ABSTRACT

The disclosure relates to a high performance fault tolerant queuing system. Multiple processors share access to one or more queues which are stored in an addressable memory. A storage controller provides general access to the addressable memory and includes queue functions for maintaining the queues. Queue access is provided in a first-come/first-served basis. In addition to the get and put queue functions, queue control within the storage control saves a queue item which is read from the queue in a location in the addressable memory which is associated with the processor making a get request, thereby alleviating the requesting processor from having to save the queue item.

28 Claims, 10 Drawing Sheets

QUEUE CONTROL WORD

PUT-QUEUE-AND-CLEAR REQUEST

GET-QUEUE-AND-SAVE REQUEST

FAULT TOLERANT APPARATUS AND METHOD FOR MAINTAINING ONE OR MORE QUEUES THAT ARE SHARED BY MULTIPLE PROCESSORS

This is a continuation of application Ser. No. 08/230,96 filed on Apr. 21, 1994, now abandoned.

CO-PENDING PATENT APPLICATIONS

This patent application is related to the following co-pending patent applications, all of which are herein incorporated by reference:

(1) "Outboard File Cache System" to Thomas P. Cooper and Robert E. Swenson, was filed Dec. 23, 1993, is assigned to the assignee of the present invention, and has a Ser. No. 08/174,750.

(2) "Extended Processing Complex for File Caching" to Larry Byers, James Torgerson, and Ferris Price, was filed Dec. 23, 1993, is assigned to the assignee of the present invention, and has a Ser. No. 08/173,459.

(3) "Hub and Street Architecture" to Donald Mackenthun, Larry Byers, Gregory Wiedenman, and Ferris Price, was filed Dec. 23, 1993, is assigned to the assignee of the present invention, and has a Ser. No. 08/173,429.

BACKGROUND OF THE INVENTION

1. Field of the Invention

This invention generally relates to queue architectures and more particularly relates to a fault tolerant queue architecture in a multiprocessor environment.

2. Description of the Prior Art

The use of the queue construct has been widespread in the design of general purpose data processing systems. An exemplary general application of a queue may involve a first processor that puts items in a queue and a second processor that gets items from the queue, wherein each of the items in the queue represents a task to be performed. If each of the tasks (items in the queue) may be performed independent of the other tasks in the queue, then additional processors could be included to put tasks in and get tasks from the queue.

Fault tolerance may be a desirable characteristic in a queue design, depending upon the application in which the queue is used. If fault tolerance is desired in a system having a first processor for putting tasks into a queue and a second processor for getting tasks from the queue and performing the tasks, then the queue architecture must ensure that if the second processor fails in getting a task from the queue, the task is not simply lost.

If, in addition to fault tolerance, multiple processors have access to the queue for performance considerations, then the queue design must ensure that the adverse impact on performance which may be caused by the fault tolerance mechanism is minimized.

U.S. Pat. No. 5,265,229 to Sareen which is entitled "Single Load, Multiple Issue Queue with Error Recovery Capability" (hereinafter '229) describes a dual access queuing system in the context of data transfer logic within a data processing system. The queuing system entails dual circuitry for reading from the queue. The first read circuitry reads odd entries from the queue, and the second read circuitry reads even entries. While the first read circuitry is waiting for acknowledgement from the device designated to receive the queue entry, the second circuitry may commence transfer of another (even) queue entry. If transmission of the queue entry by the first read circuitry fails, it retransmits the queue entry. It can be seen that each read circuitry must wait for acknowledgment from the receiving unit before another queue entry is read. Furthermore, if the first read circuitry becomes inoperable while the second read circuitry remains operable, the second read circuitry is unable to recover for the first because it is dedicated to reading one set of addresses from the queue.

It would therefore be desirable to have a multiprocessor queuing system which is fault tolerant and in which processing performance is not adversely impacted by such fault tolerance.

SUMMARY OF THE INVENTION

An object of the invention is a queuing system with centralized control of a queue that is shared between multiple processors.

Another object is a queuing system with centralized control in which multiple queues are shared between multiple processors.

A further object of the invention is a queuing system where queue items are recoverable after they have been read from the queue.

Yet another object of the invention is a queuing system in which a queue item in process by a first processor may be recovered and processing completed by a second processor.

According to the present invention, the foregoing and other objects and advantages are attained in a system that includes an addressable memory and a storage controller for providing access to the addressable memory. Two or more processors are communicatively coupled to the addressable memory and each of the processors may read data from and write data to the addressable memory. The storage controller includes queue control for maintaining one or more queues which are designated by the processors. The queue control processes get-queue and put-queue requests which are sent to the storage controller from each of the processors. Each of the processors submitting get-requests may optionally designate a location in the addressable memory at which items read from the queue are saved by the queue control. And a processor may indicate that it has completed processing an item read from a queue by submitting a put-queue-and-clear request to the storage controller. Queue control in the storage controller clears the specified location in the addressable memory, thereby clearing a saved queue item. Each of the processors monitors the processing status of another one of the processors. A failed processor is detected and a queue item in process by the failed processor may be recovered from the failed processor's location in the addressable memory for saving queue items.

Still other objects and advantages of the present invention will become readily apparent to those skilled in the art from the following detailed description, wherein only the preferred embodiment of the invention is shown, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

FIG. 1 show an exemplary environment in which the present invention may be used;

FIG. 2 contains a functional block diagram of multiple processors and one or more queues that are shared by the processors;

FIG. 3 shows the general format of a Queue;

FIG. 4 shows the information contained in the Queue Control Word;

FIG. 5 illustrates the information contained in a Put-Queue-and-Clear request;

FIG. 6 illustrates the information contained in a Get-Queue-and-Save request;

FIG. 7 contains a flowchart of Put Processing;

FIG. 8 contains a flowchart of the processing performed by the Queue Control 112 for a Put-Queue-and-Clear request;

FIG. 9 contains a flowchart of Get Processing which may be performed by the Processors;

FIG. 10 contains a flowchart of the processing performed by Queue Control 112 for a Get-Queue-and-Save request;

FIG. 11 is a functional block diagram of Queue Control; and

FIG. 12 contains a logic diagram of Function Control Logic.

DESCRIPTION OF THE PREFERRED EMBODIMENT

Figure 1:
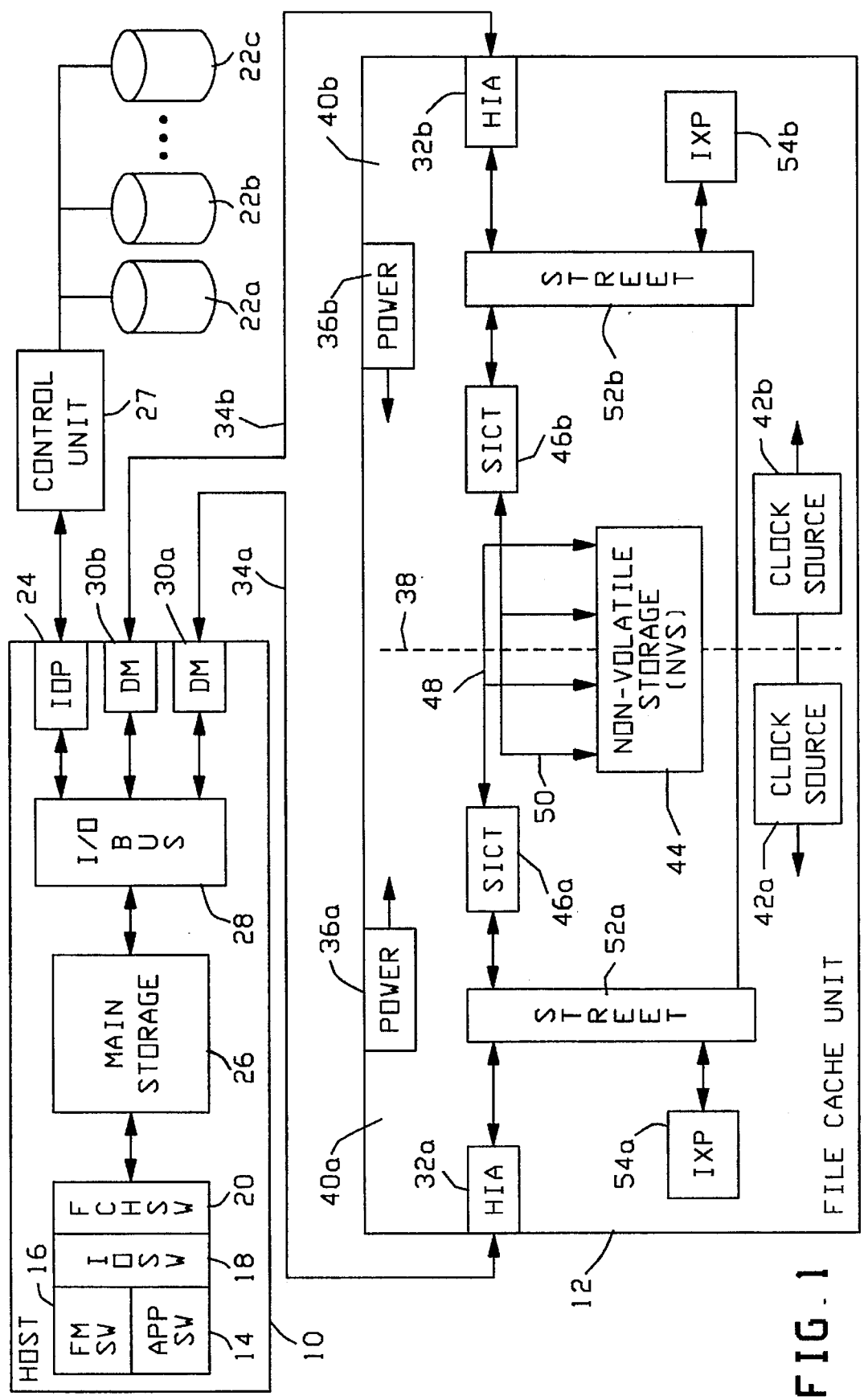
FIGS. 1–12, briefly described below, represent an embodiment of the invention as defined in the claims.

FIG. 1 shows an exemplary environment in which the present invention may be used. The overall system is comprised of hardware and software elements in both the Host 10 and Outboard File Cache 12. The software on Host 10 is shown by blocks 14, 16, 18, and 20. The blocks are joined to signify the interrelationships and software interfaces between the software elements.

Application Software 14 provides data processing functionality to end users and includes applications such as bank transaction processing and airline reservations systems. Data bases maintained by Application Software 14 may be stored in one or more files stored on Disks 22a, 22b, and 22c. File Management Software 16, Input/Output Software 18, and File Cache Handler Software 20 are all part of the operating system (not shown). In general File Management Software 16 provides overall management of file control structures, and in particular handles the creating, deleting, opening, and closing of files.

Input/Output Software 18 provides the software interface to each of the various I/O devices coupled to the Host 10. The I/O devices may include network communication processors, magnetic disks, printers, magnetic tapes, and optical disks. Input/Output Software 18 builds channel programs, provides the channel programs to the appropriate Input Output Processor 24, and returns control to the requesting program at the appropriate time.

File Cache Handler Software 20 coordinates the overall processing for cached files. In general, File Cache Handler Software 20 provides the operating system level interface to the Outboard File Cache 12, stages file data from Disks 22 to the Outboard File Cache 12, and destages file data from the Outboard File Cache to Disks. The File Cache Handler Software provides file data and file access commands to the hardware interface to the Outboard File Cache via Main Storage 26. Control Unit 27 provides access to Disks 22a, 22b, and 22c.

A Data Mover (DM) 30a provides the hardware interface to the Outboard File Cache 12. While two DMs 30a and 30b are shown, the system does not require two DMs for normal operations. A configuration with two DMs provides fault tolerant operation; that is, if DM 30a fails, DM 30b is available to process file requests. Each of the DMs is coupled to the Input/Output Bus 28 of Host 10. File Cache Handler Software 20 distributes file access commands among each of the DMs coupled to Input/Output Bus. If DM 30a fails, file access commands queued to DM 32a can be redistributed to DM 30b.

The DMs 30a and 30b provide functionality which is similar to the IOPs 24, that is to read data from and write data to a peripheral device. The DMs can directly read from and write to Main Storage 16 via the I/O Bus 28. The DMs coordinate the processing of file access commands between File Cache Handler Software 20 and the Outboard File Cache 12 and move file data between Main Storage 26 and the Outboard File Cache. Each of the DMs is coupled to a Host Interface Adapter (HIA) 32 logic section within the Outboard File Cache. DM 30a is coupled to HIA 32a by a pair of fiber optic cables shown as Line 34a, and DM 30b is coupled to HIA 32b by a second pair of fiber optic cables shown as Line 34b.

The Outboard File Cache 12 is configured with redundant power, redundant clocking, redundant storage, redundant storage access paths, and redundant processors for processing file access commands, all of which cooperate to provide a fault tolerant architecture for storing file data. The Outboard File Cache is powered by dual Power Supplies 36a and 36b. The portion of the Outboard File Cache to the left of dashed line 38 is powered by Power Supply 36a and is referred to as Power Domain 40a, and the portion of the Outboard File Cache to the right of dashed line 38 is powered by Power Supply 36b and is referred to as Power Domain 40b. Each of the Power Supplies has a dedicated battery and generator backup to protect against loss of the input power source.

Two separately powered Clock Sources 42a and 42b provide timing signals to all the logic sections of Outboard File Cache 12. Clock Source 42a provides timing to the logic sections within Power Domain 40a and Clock Source 42b provides timing to the logic sections within Power Domain 40b. Redundant oscillators within each Clock Source provide protection against the failure of one, and the Clock Sources are synchronized for consistent timing across the Power Domains.

Non-Volatile Storage (NVS) section 44 includes multiple DRAM storage modules and provides the cache memory for file caching. Half of the storage modules are within Power Domain 40a and the other half are within Power Domain 40b. The data contained within the storage modules in Power Domain 40b reflects the data stored in storage modules within Power Domain 40a. NVS 44 thereby provides for redundant storage of file data and the control structures used by the Outboard File Cache 12. The redundant storage organization provides for both single and multiple bit error detection and correction.

The portion of NVS 44 within each of the Power Domains 40a and 40b is coupled to two Storage Interface Controllers (SICTs) 46a and 46b. While only two SICT are shown, each half of NVS 44 is addressable by up to four SICT. Line 48 represents the coupling between SICT 46a and the portion of NVS 44 within each of Power Domains 40a and 40b. Similarly, Line 50 represents the coupling between SICT 46b and NVS.

Read and write requests for NVS 44 are sent to the SICTs 46a and 46b via Street Networks 52a and 52b. The Street Network provides the data transfer and interprocessor communication between the major logic sections within the Outboard File Cache 12. The Street Network is built to provide multiple requesters (HIAs 32a and 32b or Index Processors 54a and 54b) with high bandwidth access to NVS 44, as well as multiple paths for redundant access. Crossover 56 provides a path whereby NVS 44 requests may be sent from Street 52a to Street 52b, or visa versa, if a SICT is unavailable. For example, if SICT 46a fails, NVS requests sent from requesters (HIAs and IXPs) are sent to Street 52b via Crossover 56, whereby NVS 44 access is provided by SICT 46b.

The HIAs 32a and 32b are programmed microprocessors which provide functionality in the Outboard File Cache 12 which is similar to the functionality provided by the DMs 30a and 30b on the Host 10. In particular, the HIAs receive file access commands sent from the DM and provide general cache access control such as writing file data sent from the Host to Non-Volatile Storage (NVS) 44 and reading file data from NVS and sending it to the Host. The HIAs also contain the logic for sending and receiving data over fiber optic Cables 34a and 34b.

Index Processors (IXPs) 54a and 54b are programmed microprocessors which manage allocation and cache replacement for the storage space available in NVS 44, service file data access commands sent from Host 10, and generally provides for overall file cache management. The IXPs contain microcode control for detecting whether the file data referenced in a file data access command is present in the cache memory, and for managing and coordinating access to the cache memory.

The HIAs 32a and 32b and the IXPs 54a and 54b communicate via the Streets 52a and 52b and via a logical queue which is maintained in NVS 44. The queue of the exemplary system is called the Activity Queue. Each entry in the Activity Queue references an Outboard File Cache command which an IXP may process. Each of the HIAs puts entries in the Activity Queue and each of the IXPs gets entries from the Activity Queue for processing the associated command. Either one of the IXPs may process commands submitted by either one of the HIAs. In addition each IXP is programmed to monitor the other IXP. Should one of the IXPs fail, the other IXP may recover for the failed IXP.

Figure 2:
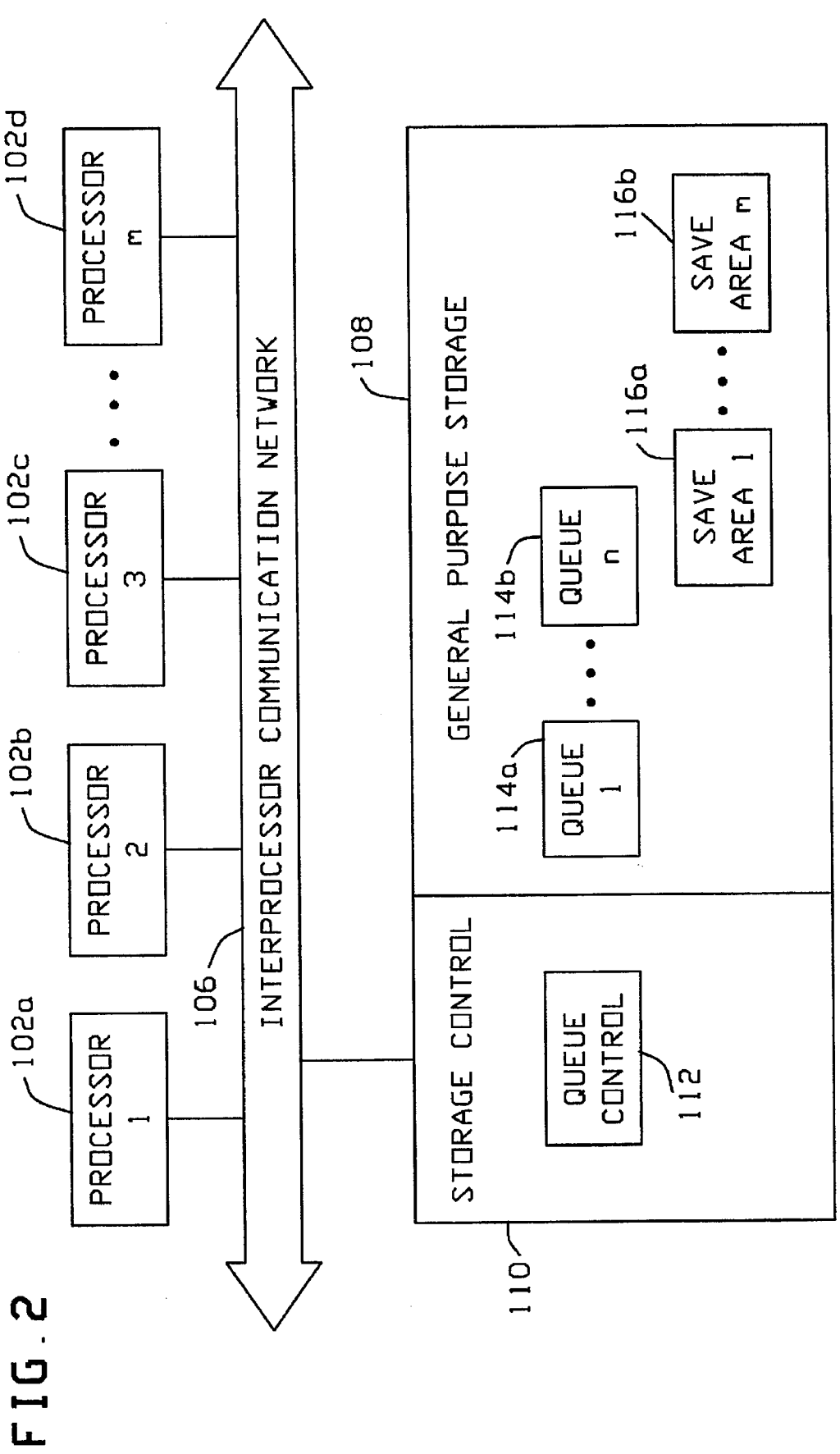

FIG. 2 contains a functional block diagram of multiple processors and one or more queues that are shared by the processors. There are m processors shown in FIG. 2, referenced as 102a–d. Each Processor 102a–d may be a general purpose programmable microprocessor or special purpose programmed microprocessor such as the HIAs 32a and 32b and IXPs 54a and 54b of the exemplary system. Each Processor 102a–d may be programmed to put entries in and get entries from selectable ones of the shared of shared Queues 114a–b. The programmed function of each of the Processors is dependent upon the application. For fault tolerance, it is desirable to have redundant processors so that a first processor may recover complete the processing of a task being performed by a second failed processor.

Each Processor 102a, 102b, 102c, and 102d is communicatively coupled to the Interprocessor Communication Network 106. In the exemplary system, the Interprocessor Communication Network is provided by the Streets 52a and 52b. Those skilled in the art will recognized that a general purpose bus or other equally suitable communication network could be used in the present invention. The co-pending application entitled "Hub and Street Architecture" may be consulted for further details on the Street Architecture.

Access to general purpose RAM Storage 108 is provided by Storage Control 110 which is also communicatively coupled to the Interprocessor Communication Network 106. The general purpose Storage corresponds to the NVS 44 in the exemplary system, and for the purpose of the present invention may be a general purpose addressable memory. As discussed in the co-pending patent application for the Outboard File Cache System, the NVS is used for storing the cached file data, the control structures which are used to maintain the cache storage, and the control structures which are used for coordinating processing of file access requests. It should be understood that for the purposes of the present invention, Storage 108 is not required to possess the same functional characteristics as the NVS of the co-pending application, but instead Storage 108 may be a more general purpose storage system.

The Storage Control 110 contains the control required for interfacing with the Interprocessor Communication Network 106 and reading data from and writing data to the Storage 108. The Storage Control contains logic for processing Storage read and write requests. In addition, logic is contained therein for processing two additional commands, a Put-Queue-and-Clear request and a Get-Queue-and-Save request. Thus, the Queue Control 112 is an integral part of the Storage Control logic.

The Put-Queue-and-Clear and the Get-Queue-and-Save requests are implemented as indivisible operations, that is, the Storage Control may only process one such queue request at a time and is non-interruptable during that time. Because of this, conflicts between the Processors 102a–d for access to the one or more shared queues are resolved at the Storage Control 110 level. Requests for access to the queues are handled on a first-come first-served basis.

One or more Queues 114a–b may be maintained in Storage 108, depending upon the application of the queuing architecture. In the exemplary system the Activity Queue is the queue that is shared by the IXPs 54a and 54b and the HIAs 32a and 32b. Even though the exemplary system only uses one queue, the Activity Queue, the present invention provides for sharing multiple Queues 114 by the Processors 102a–d, all under the control of Queue Control 112.

Each Processor 102a–d has an associated Save Area 116a–b. Each Save Area is used as a backup store for an entry that a Processor reads from a Queue 114. In addition to saving a Queue entry in process, the Save Area may be used for storage of state information of the Processor while it is processing the Queue entry. The particular state information is application dependent. When a Get-Queue-and-Save request is issued, Queue Control 112 gets an entry from the referenced Queue and saves the entry in the Save Area designated by the Processor that submitted the request. The Queue entry is saved before returning the entry to the Processor. This relieves the Queue Control 112 from having to wait for acknowledgment from the requesting Processor before processing the next Queue access request. In addition, Queue entries are recoverable if the requesting Processor fails before it receives the Queue entry.

The other queue operation that is part of the preferred embodiment is the Put-Queue-and-Clear request. This operation may be used by a Processor 102a–d that gets an entry from a first Queue, processes the entry, and then puts a different entry in a second Queue when processing of the entry from the first Queue is complete. The "clear" part of the request indicates to Queue Control 112 that the entry from the first Queue which was saved in the designated Save Area 116 should be cleared.

The "clear" function of the Put-Queue-and-Clear request is optional. That is items may be put on one of the Queues 114a–b without having to clear any of the Save Areas 116a–b. This feature finds use in the exemplary system where each HIA 32a and 32b is dedicated to putting tasks in the Activity Queue for the IXPs 54a and 54b to process. Status reporting between an IXP and HIA is done directly, i.e. without the use of another queue.

Figure 3:
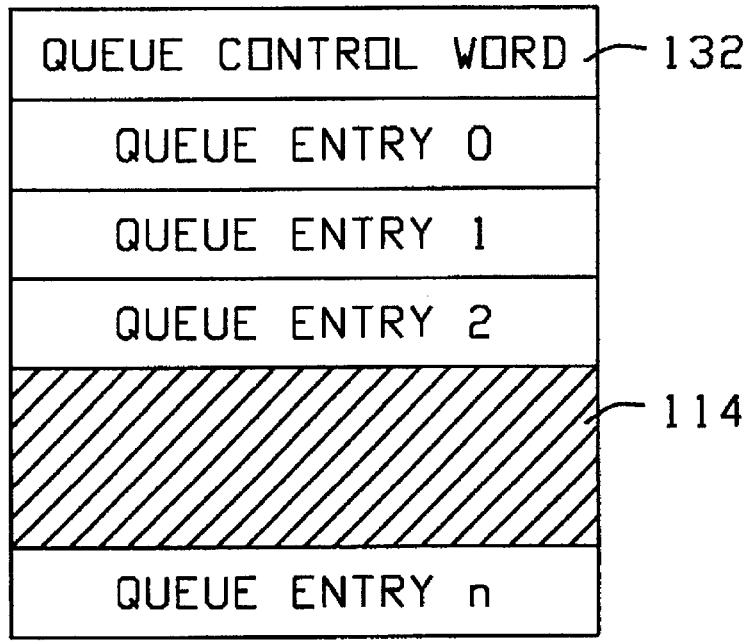

FIG. 3 shows the general format of the Queues 114a–b. Each Queue may be of arbitrary length, and the size of each entry in the Queue depends upon the application of each Queue. In the preferred embodiment, each Queue is of finite size and the Queue is maintained in the physical storage space in a circular fashion. At the beginning of each Queue is a Queue Control Word 132. The Queue Control Word is used by Queue Control to maintain the Queue.

Figure 4:
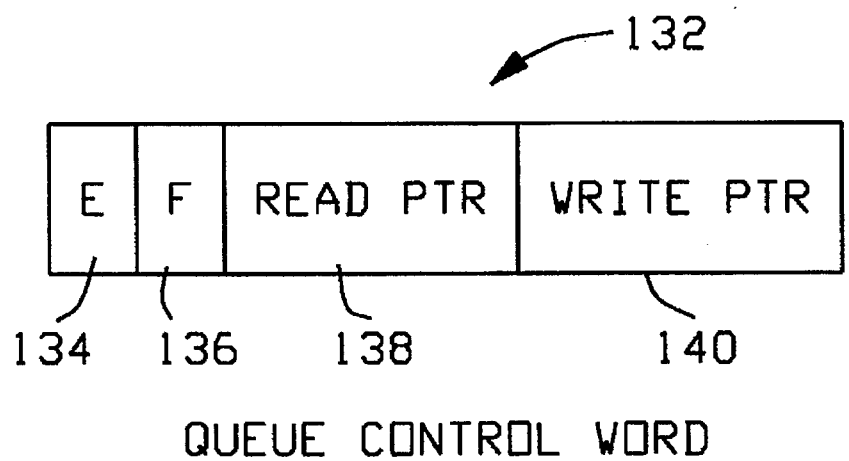

FIG. 4 shows the information contained in the Queue Control Word 132. The Empty flag 134 indicates whether there are any entries in the associated one of the Queues 14a–b and the Full flag 136 indicates whether the Queue has space available for an additional entry.

The Read Pointer 138 is used for processing Get-Queue-and-Save requests, and the Write Pointer 140 is used for processing Put-Queue-and-Clear requests. Each of the pointers is an offset in the physical space allocated to a Queue relative to the Queue Control Word.

Figure 5:
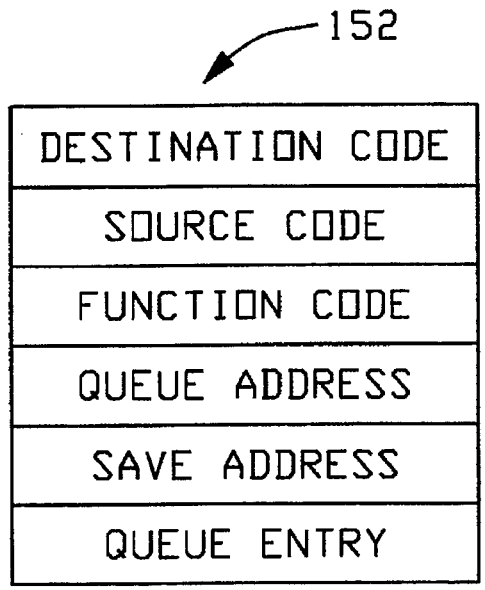

FIG. 5 illustrates the information contained in a Put-Queue-and-Clear request 152. The Destination Code indicates the processor to which the request is directed. The Destination Code is used by the Interprocessor Communication Network for routing the request packet. For the Put-Queue-and-Clear request the destination would indicate the Storage Control 110. The Source Code indicates the functional unit from which the request packet originated. In the preferred embodiment, the Source Code would indicate a particular one of the Processors 102a–d.

The Function Code specifies a Put-Queue-and-Clear operation, and the Queue Address identifies the physical address in Storage 108 at which the desired one of the Queues 114a–b is stored. The Save Address specifies the address in the associated one of the Save Areas 116a–b which is to be cleared by the Put-Queue-and-Clear request. Finally, the Queue Entry is the specific data that is to be added to the end of the desired Queue.

Figure 6:
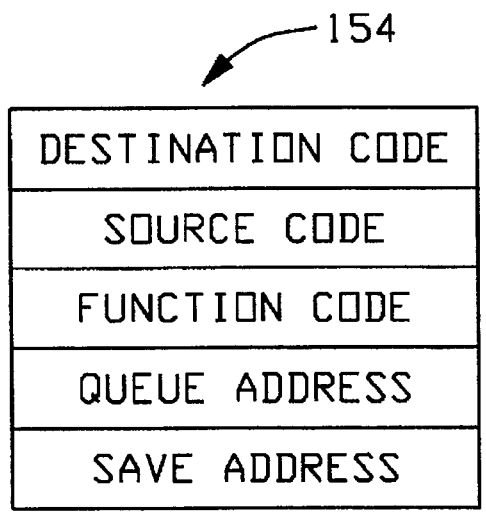

FIG. 6 illustrates the information contained in a Get-Queue-and-Save request 154. The Destination Code indicates the processor to which the Get-Queue-and-Save request is directed, i.e., the Storage Control 110. The Source Code indicates the particular Processor 102a–d from which the request originated.

The Function Code specifies a Get-Queue-and-Save operation and the Queue Address specifies the location in Storage 108 at which the desired one of the Queues 114a–b is stored. The Save Address is the location in the Save Area 116 at which the Queue entry which is read from the Queue is stored for purposes of recovery.

Figure 7:
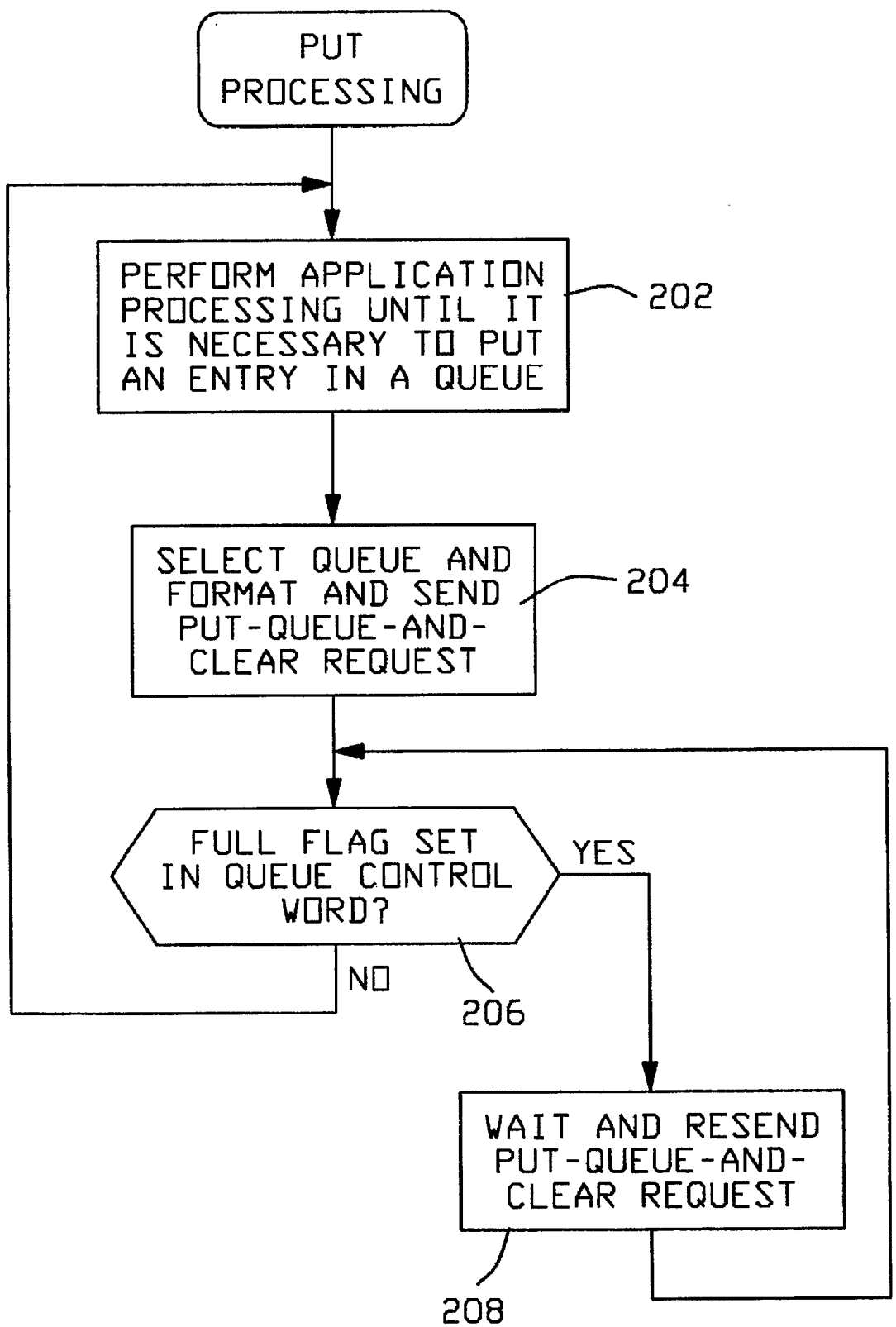

FIG. 7 contains a flowchart of Put Processing. Put Processing is performed by any one of the Processors 102a–d according to the application requirements. The general function of Put Processing is to put an entry in selectable ones of the Queues 114–b.

While not shown, it will be understood that before queue operations are allowed, the Queues 114 must be initialized. The Queues are initialized by writing a Queue Control Word 132 for each of the desired Queues. This may be done at system initialization time or during runtime, as long as all processors having access to the Queues 114a–b are aware of the location in Storage 108 at which the Queue(s) are stored.

At Step 202 the Processor 102a–d performs the application specific processing that it has been programmed to perform. In the case of the exemplary system, the HIAs 32a and 32b are programmed to receive file access commands from the DMs 30a and 30b and transfer data to and from the Outboard File Cache 12. For a file access command received from a DM, the HIA makes an entry in the Activity Queue. The IXPs monitor the Activity Queue for file access commands to process. Note that a Processor 102a–d may be programmed to both get entries from a Queue and put entries in the same or a different Queue, depending upon the application.

While the exemplary system only uses one queue, i.e., the Activity Queue, it should be understood that the present invention allows for multiple queues to be shared between an arbitrary number of Processors 102a–d. Thus, Step 204 involves selecting one of the shared Queues 114a–b in which to put an item. The particular Queue chosen is application dependent. The Queues may be used for purposes such as storing a set of tasks to perform or general message passing.

In selecting one of the Queues 114a–b, a Processor 102a–d must determine the address in Storage 108 at which the chosen Queue is stored. The Queue Address is then included in the Put-Queue-and-Clear request 152 that is sent to the Storage Control 110. If the Processor that is submitting the put request is doing so as a result of having completed processing of a different entry from a Queue, then the Processor should clear its Save Address along with the put to indicate that it has complete such processing. The Processor determines its Save Address and includes it in the request packet. As part of the Storage Controller processing of the Put-Queue-and-Clear request, the portion of one of the Save Areas 116a–b which is associated with the requesting Processor is cleared as referenced by the Save Address portion of the Put-Queue-and-Clear request packet.

The Storage Control 110 returns the Queue Control Word 132 for the chosen Queues 114a–b to the Processor 102a–d that sent the Put-Queue-and-Clear request 152. If the Full flag 136 in the Queue Control Word is set, decision Step 206 directs control to Step 208. If the chosen Queue is full, the Processor must wait and resubmit the Put-Queue-and-Clear request as indicated at Step 208.

Figure 8:
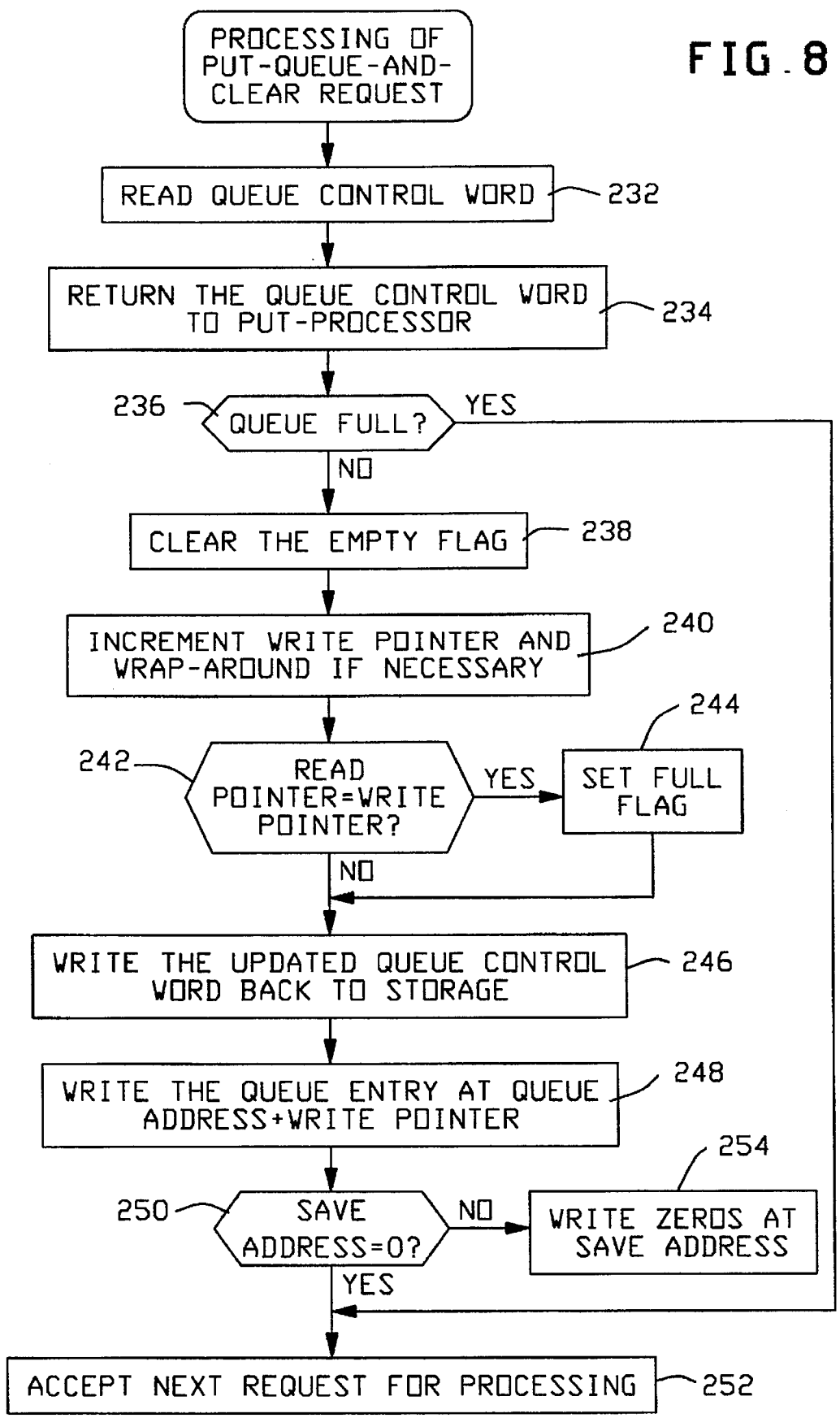

FIG. 8 contains a flowchart of the processing performed by the Queue Control 112 for a Put-Queue-and-Clear request 152. Processing of the Put-Queue-and-Clear request is an indivisible Storage 108 operation that puts an entry into the designated one of the Queues 114a–b and clears the location in the specified one of the Save Areas 116a–b for the Processor 102a–d. If the Save Address in the request is zero, then no portion of the Save Area will be cleared in processing the Put-Queue-and-Clear request. Thus, a Processor may optionally clear a saved Queue Entry. If a non-zero Save Address is specified, the saved Queue Entry will be cleared, otherwise no clear operation is performed. The "clear" part of the Put-Queue-and-Clear request may not be appropriate in an application, such as the exemplary system, where a Processor (such as the HIA 32a and 32b) puts entries in a Queue but does not get entries from a Queue. Therefore, it is advantageous to make the "clear" function optional to provide for maximum flexibility.

The Queue Control 112 first reads the Queue Control Word 132 that is located at the Queue Address specified in the Put-Queue-and-Clear request 152 at Step 232. The Queue Control Word is then returned to the requesting Processor 102a–d as identified by the Source Code in the request, as shown by Step 234. Queue Control then tests the Full flag 136 as indicated by decision Step 236. If the associated one of the Queues 114a–b is full, processing of the request is aborted and Storage Control 110 is available to accept another request. The requesting Processor will know that the Queue is full by the testing the Queue Control Word that was returned by Storage Control. If the Queue is not full, control is directed to Step 238.

At Step 238, Queue Control 112 clears the Empty flag 134 in the Queue Control Word 132 that was read at Step 232. The Write Pointer 140 is incremented to reference the next entry in the associated one of the Queues 114a–b. If the Write Pointer then references space beyond then physical space allocated to the Queue, the Write Pointer is reset to reference the first physical entry in the Queue.

Queue Control 112 tests at decision Step 242 whether the associated one of the Queues 114a–b will be full after the entry is put in the Queue, If so, control is directed Step 244 where the Full flag 136 is set. Otherwise, control proceeds directly to Step 246. At Step 246, the updated Queue Control Word 136 is written back to Storage 108 at the location indicated by the Queue Address in the Put-Queue-and-Clear request 152. Step 248 writes the Queue Entry from the request at the address in Storage indicated by Queue Address plus the Write Pointer index.

Decision Step 250 tests whether the Save Address in the Put-Queue-and-Clear request 152 is equal to zero. If the Save Address equals zero, no portion of the associated one of the Save Areas 116a–b which is associated with the requesting Processor 102a–d is cleared and control is directed to Step 252 where Storage Control 108 accepts the next request for processing. Otherwise, control is directed to Step 254 where zeros are written to the location in Storage indicated by the Save Address to clear the designated location.

Figure 9:
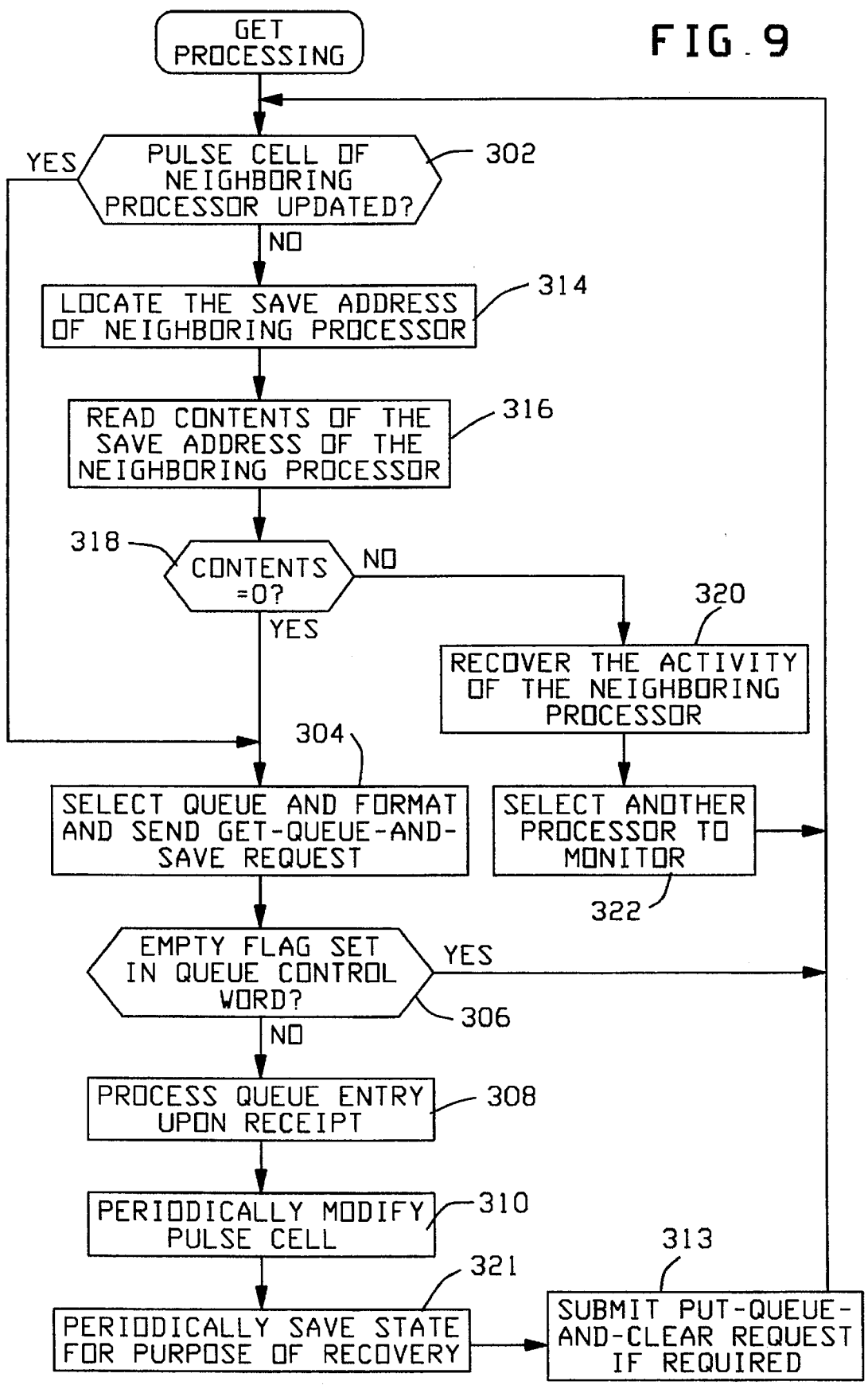

FIG. 9 contains a flowchart of Get Processing which may be performed by the Processors 102a–d. Each Processor may be programmed to monitor the processing status of one of the other Processors for purposes of recovery of a failed Processor. If one of the Processors should fail, another Processor may take over the processing of the failed Processor.

A heartbeat mechanism is used by each Processor 102a–d that is programmed for recovery to monitor the status of another one of the Processors. The heartbeat mechanism consists of a pulse-cell, which is a location in Storage 108, for each of the Processors. Each Processor periodically decrements its pulse-cell and a monitoring Processor periodically reads the pulse-cell of its neighboring Processor. For example, Processor 102a monitors Processor 102b, Processor 102b monitors Processor 102c, . . . , and Processor 102d monitors Processor 102a. If the neighboring Processor's pulse-cell remains unchanged after an application dependent number of checks, the neighboring Processor may be presumed to have failed and the monitoring Processor may take the necessary recovery steps.

Each monitoring Processor 102a–d performs decision Step 302 to test whether the pulse-cell of its neighboring Processor has been updated. If the pulse-cell has been updated, processing may proceed normally and control is directed to Step 304 to select the desired one of the Queues 114a–b and format and send a Get-Queue-and-Save request 154. The particular Queue selected is application dependent. The request is sent to Storage Control 110.

After receiving the Queue Control Word 132 that is returned from Storage Control 110, the receiving Processor 102a–d tests whether the Empty flag 134 contained therein is set. If so, decision Step 306 returns control to decision Step 302 to once again monitor the status of the neighboring Processor. Note that the processing sequence described assumes that the Processor is programmed only to monitor the Queues 114a–b and process entries read from the Queues. This is not intended to in any way limit the scope of the invention.

Once a Processor 102a–d receives a Queue Entry from Storage Control 110, the Queue Entry is processed according to application dependent functions. In the exemplary system, an IXP 54a or 54b uses the entry read from the Activity Queue to obtain an actual task to process from one of the HIAs 32a or 32b.

To indicate to the monitoring Processor 102a–d that a Processor is still available, each Processor periodically updates its associated pulse-cell as indicated by Step 310. In addition, at Step 312 each Processor periodically saves the state of its processing and any data structures which it has modified during the course of its processing of a task to provide for recoverability. The particular data saved and the frequency with which the data is saved is dependent upon the particular application for which the Processors are programmed.

If at Step 302 a Processor 102a–d detects that its neighboring Processor has failed, control is directed to Step 314. As will be recalled from an earlier portion of this discussion, the Queue Control 112 saves each Queue Entry it reads in Storage 108 at the location specified by the Save Address in the Get-Queue-and-Save address. Thus, the Queue Entry in process by a Processor may be obtained by reading the contents of the Save Address. Step 314 determines the Save Address that is associated with the failed Processor, and Step 316 reads the contents of Storage at Save Address. Decision Step 318 tests whether the contents of Storage read at Save Address is equal to zero. If so, control is directed to Step 304 as discussed above. Otherwise, control is directed to Step 320 to recover processing of the Queue Entry that was in process by the failed Processor. The particular recovery processing required depends on the nature of the application for which the present invention is used.

In a system where there are more than two Processors programmed to be interchangeable, each of the Processors would monitor the pulse-cell of its neighboring Processor. If the neighboring Processor fails, the monitoring Processor would recover the activity being processed by the failed Processor as described above. In addition, the Processor performing the recovery would then monitor the neighboring Processor of the failed Processor as shown by Step 322.

Figure 10:
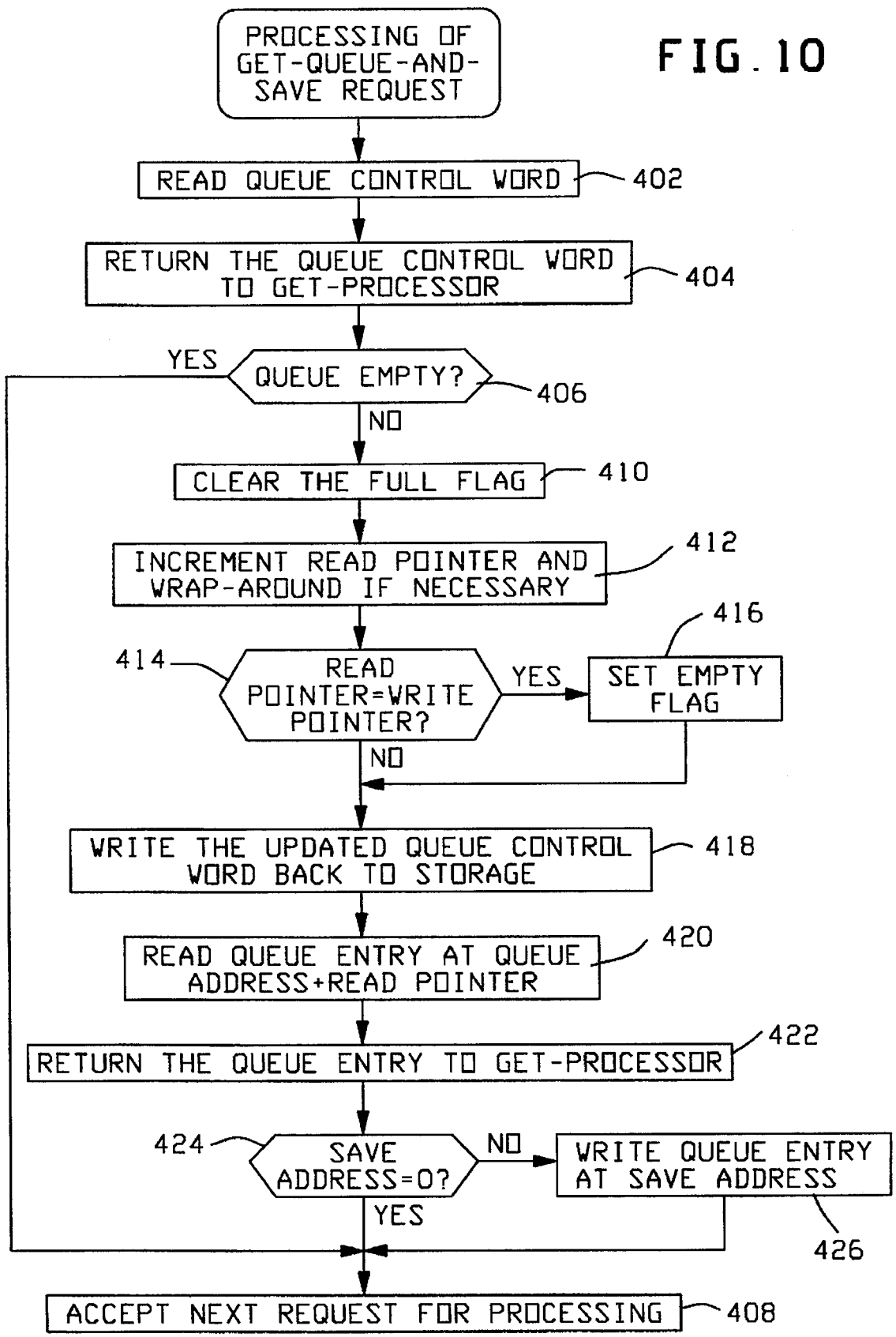

FIG. 10 contains a flowchart of the processing performed by Queue Control 112 for a Get-Queue-and-Save request 154. The first step taken by Queue Control in processing a Get-Queue-and-Save request is to read the Queue Control Word 132 for the specified Queue as indicated by Step 402. The Queue Control Word is read from the address specified by Queue Address in the Get-Queue-and-Save request. At Step 404 the Queue Control Word is returned to the requester which is indicated by the Source Code from the Get-Queue-and-Save request.

Queue Control 112 tests whether the specified one of Queues 114a–b is presently empty at Step 406 by testing the Empty flag 134 of the Queue Control Word 132. If the Queue is empty, control is directed to Step 408 to accept the next request for processing. Otherwise, control is directed to Step 410 to process the Get-Queue-and-Save request.

At Step 410, Queue Control 112 clears the Full flag 136 in the Queue Control Word 132, and at Step 412 increments the Read Pointer 138 to reference the next Queue entry in the specified one of Queues 114a–b. If advancing the Read Pointer causes it to reference physical storage beyond that allocated to the Queue, the Read Pointer is reset to the first physical Queue Entry for the Queue.

At decision Step 414, Queue Control 112 tests whether after the Queue Entry is read, the Queue will be empty by comparing the Read Pointer 138 and Write Pointer 140. If the Queue will then be empty, the Empty flag 134 is set at Step 416.

Queue Control 112 writes the updated Queue Control Word 132 back to storage at the address indicated by Queue Address in the Get-Queue-and-Save request 154, as indicated by Step 418, The Queue Entry at the location in the specified one of Queues 114a–b that is specified by Queue Address plus the Read Pointer offset is read from Storage 110 at Step 420, and the Queue Entry is returned to the requesting Processor 102a–d at Step 422, wherein the requesting processor is indicated by the Source Code in the request.

The last part of Queue Control 112 processing of a Get-Queue-and-Save request 154 is to optionally save the Queue Entry read from the specified one of Queues. Decision Step 424 tests whether the Save Address specified in the request is equal to zero. If no Save Address is specified, the Queue Entry is not saved and control is directed to Step 408 where Storage Control 110 is made available to accept another request for processing. Otherwise, control is directed to Step 426. At Step 426, the Queue Entry read at Step 420 is saved in the location in Storage 108 specified by Save Address in the request. Thereafter, control is directed to Step 408 as discussed above.

Figure 11:
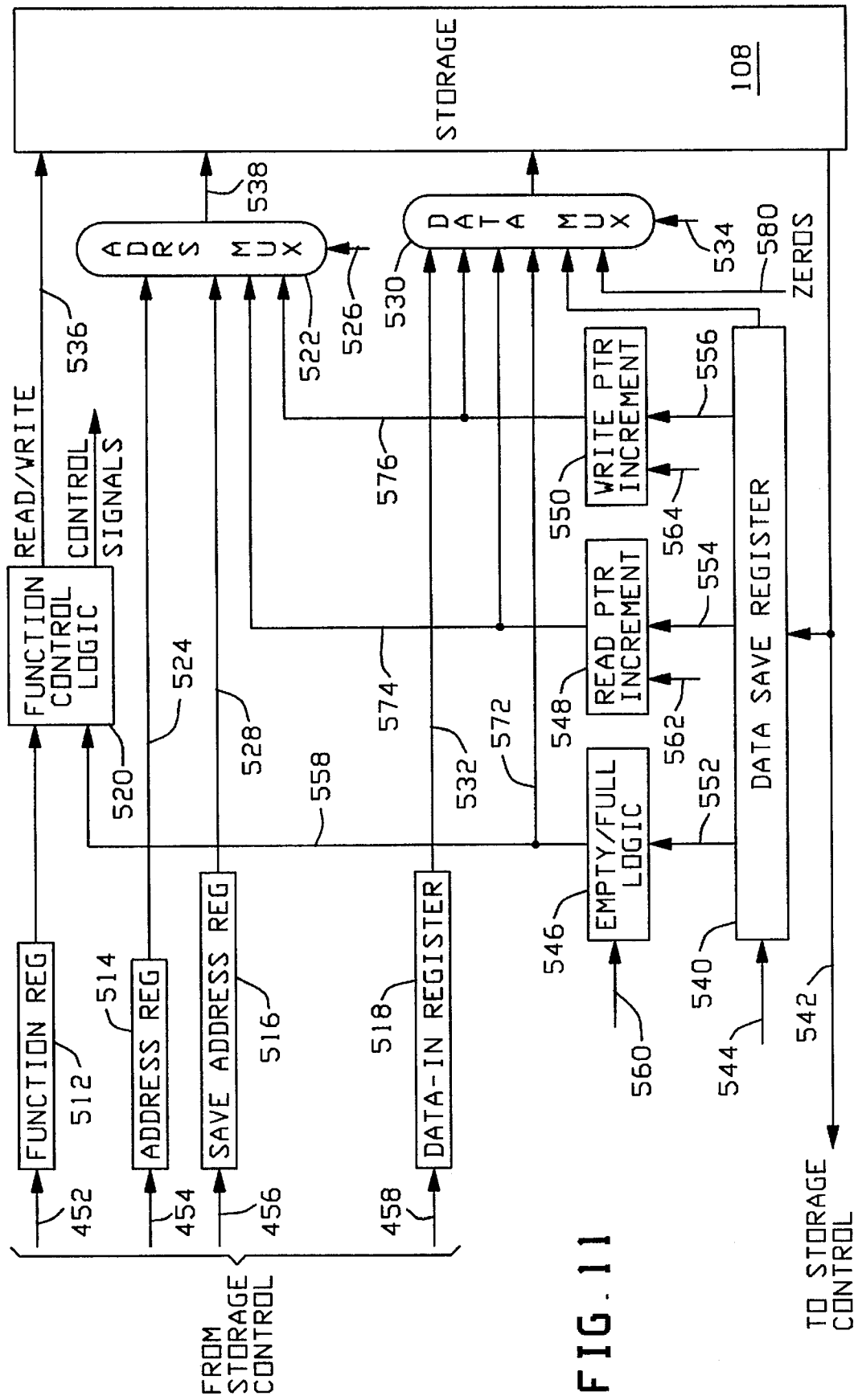

FIG. 11 is a functional block diagram of Queue Control 112. Input to Queue Control is provided in four registers. The registers include the Function Register 512, the Address Register 514, the Save Address Register 516, and the Data-in Register 518. Input to each of these registers is provided by the logic within Storage Control 110 which provides the interface to the Interprocessor Communication Network 106. The Function Register holds the Function Code that is provided in a request packet and provides input to Function Control Logic 520. In addition to the Put-Queue-and-Clear and Get-Queue-and-Save requests described above, other functions include read and write operations.

The Address Register holds the address specified in a request, and for the Put-Queue-and-Clear and Get-Queue-and-Save requests, 152 and 154 respectively, the Address Register holds the Queue Address. The Address Register is used as one of the inputs to Address Mux 522 via Line 524. Address Mux 522 selects one of the input addresses based on control signals generated by Function Control Logic 520 and supplied to the Address Mux via Line 526.

The Save Address Register stores the Save Address for Put-Queue-and-Clear and Get-Queue-and-Save requests, 152 and 154 respectively. The Save Address is used as one of the inputs to Address Mux 522 via Line 528.

The Data-in Register 518 holds the data that is specified in a request which is to be written to Storage 108. The Queue Entry in a Put-Queue-and-Clear request 154 is stored in the Data-in Register. The Data-in Register is used as one of the inputs to the Data Mux 530, and is provided to the Data Mux via Line 532. The Data Mux selects one of the inputs for writing to Storage based on control signals that are generated by Function Control Logic 520 and provided to the Data Mux via Line 534.

Function Control Logic 520 sequences the operations required for Put-Queue-and-Clear requests 152 and the Get-Queue-and-Save requests 154. See FIG. 12 for a more detailed depiction of the Function Control Logic. The remainder of FIG. 11 will be described in terms of processing a Put-Queue-and-Clear request.

Function Control Logic first generates the required signals for reading the required Queue Control Word 132 from Storage 108. A read signal is generated and supplied to Storage 108 via Line 536 and the control signals which are required to select the Address Register are supplied to the Address Mux 522 via Line 526. The address selected by the Address Mux is supplied to Storage 108 via Line 538. While not shown, it should be understood that in addition to the RAM storage provided by Storage 108, the Storage also contains logic and registers for gathering addresses to which data is written and from which data is read, calculating ECC on the incoming and outgoing data, and staging data for reading and writing.

The Queue Control Word 132 that is read from Storage 108 is provided to Data Save Register 540 via Line 542. Line 542 also returns the Queue Control Word to logic (not shown) outside Queue Control 112 so that the Queue Control Word may be returned to the Processor specified in the request. Function Control provides a control signal to the Data Save Register via Line 544, and when Line 544 is active, the Data Save Register accepts input from Line 542. Function Control 520 will activate Line 544 when the Queue Control Word is read from Storage and when a Queue Entry is read from Storage in processing a Get-Queue-and-Save request 154.

The contents of the Data Save Register 540, i.e., the Queue Control Word 132, are made available to Empty/Full Logic 546, Read Pointer Increment logic 548, and Write Pointer Increment logic 550 via Lines 552, 554, and 556 respectively. The Empty flag 134 and Full flag 136 are provided as input signals via Line 558 to the Function Control 520 so that the present state of the Queue 114 may be ascertained. Function Control Logic 520 generates control signals which are respectively provided as input via lines 560, 562, and 564 to Empty/Full Logic, Read Pointer Increment Logic, and the Write Pointer Increment Logic. This enables adjustment of the Empty flag 134, Full flag 136, Read Pointer 138 and Write Pointer 140 as may be necessary.

If the Queue Control Word 132 indicates that the Queue is not full, Function Control 520 generates signals for the next phase of processing the Put-Queue-and-Clear request 152, that is writing the updated Queue Control Word back to Storage 108. Control signals are provided to Address Mux 522 on Line 526 to select the contents of Address Register 514, and control signals are provided to the Data Mux 530 via Line 534 to select the updated Queue Control Word, that is the output signals from the Empty/Full Logic 546, Read Pointer Increment logic 548, and Write Pointer Increment logic 550 as respectively indicated by Lines 572, 574, and 576. For writing the updated Queue Control Word to Storage, a write signal is provided on Line 536.

The next phase of processing a Put-Queue-and-Clear request 152 is writing the specified Queue Entry from the request in the Queue 114. For writing the Queue Entry, Function Control 520 provides control signals to Address Mux 522 via Line 526 to select the updated Write Pointer as the location in Storage 108 in which to store the Queue Entry. Note that for purposes of clarity, the logic is not shown for generating a real Storage address from the Queue Address stored in the Address Register 514 and the Write Pointer (which is maintained as an offset or index relative to the Queue Address). Rather, the block diagram shows the output of Write Pointer Increment being directly fed to Address Mux 522 via Line 576. The same applies to the Read Pointer. For writing the Queue entry to Storage, Function Control generates a write signal and provides it to Storage via Line 536.

The last phase of processing a Put-Queue-and-Clear request 152 is to optionally clear the contents of the Save Address specified in the request. Function Control 520 generates a write signal via Line 536, provides control signals to Address Mux 522 via Line 526 to select the contents of the Save Address Register 516, and provides control signals to Data Mux 530 via Line 534 to select the all zeros input designated as Line 580, if the contents of the Save Address Register is not zero.

Figure 12:
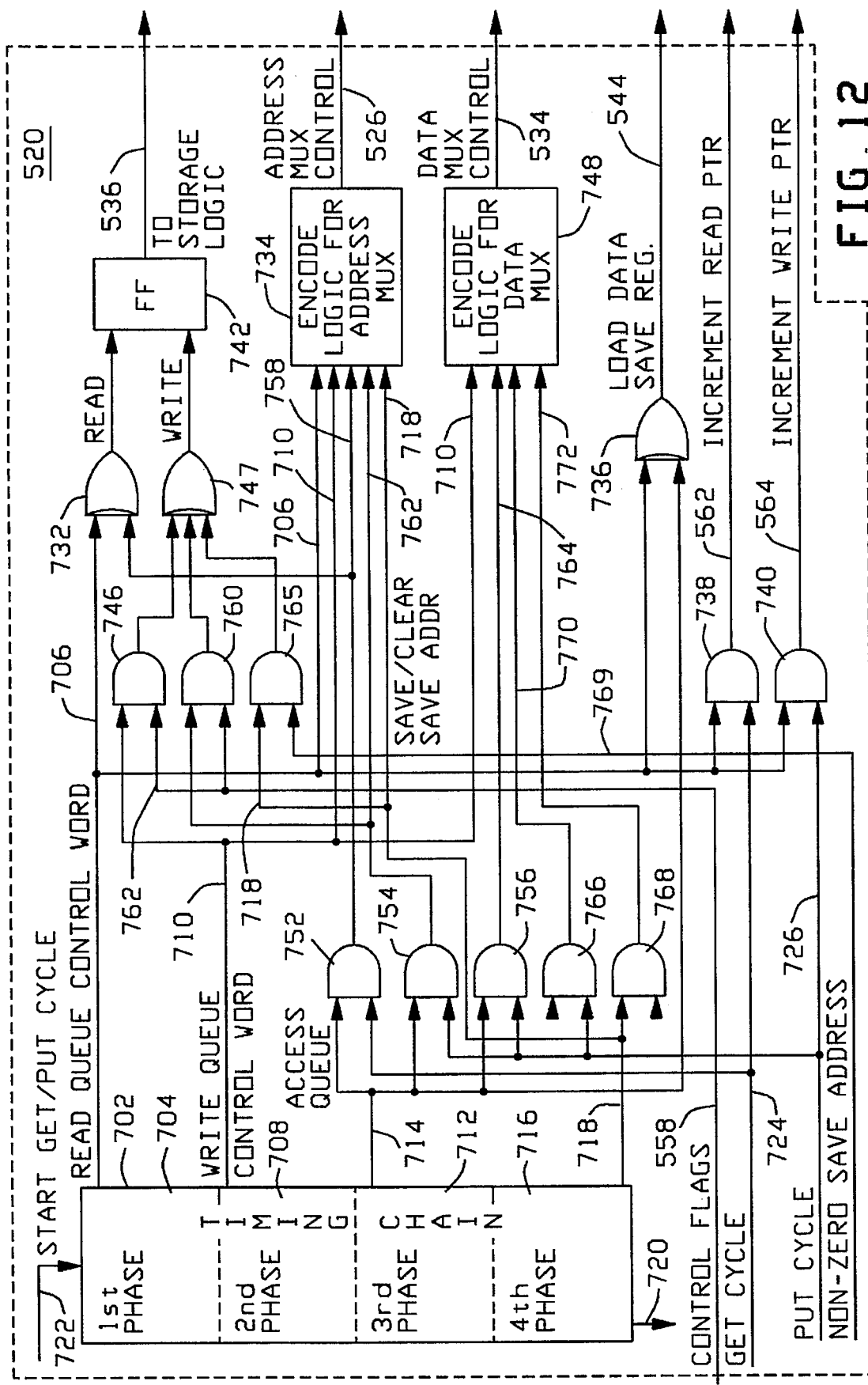

FIG. 12 contains a logic diagram of Function Control Logic 520. The Function Control Logic generates the necessary control signals for processing the indivisible operations associated with Put-Queue-and-Clear requests 152 and Get-Queue-and-Save requests 154. Function Control Logic includes a Timing Chain designated as block 702. The Timing Chain block is divided into four areas by three dashed lines to correspond to the four different phases of processing. Control signals associated with reading the Queue Control Word 132 are generated in the portion of the Timing Chain designated as Phase 704. The control signals generated in Phase 704 are shown collectively as Line 706.

The second Phase 708 of the Timing Chain 702 generates the control signals required to write the updated Queue Control Word 132 back to Storage 108. The control signals generated in Phase 708 are shown collectively as Line 710. The signals associated with writing the Queue Control Word are generated after the read Queue Control Word Phase 704 is complete.

The third Phase 712 of the Timing Chain 702 generates the control signals required to provide access to the desired Queue 114. For a Put-Queue-and-Clear request 152 an entry is written to the Queue, and for a Get-Queue-and-Save request 154 an entry is read from the Queue. The control signals generated in access Queue Phase 712 are shown collectively as Line 714, and are generated after the write Queue Control Word Phase 708 is complete.

The fourth and final Phase 716 of the Timing Chain 702 generates the control signals required to save or clear the contents of Storage 108 at the Save Address specified in the request 152 or 154. For a Put-Queue-and-Clear request the contents of Storage at Save Address is cleared, unless the specified Save Address is equal to zero, and for a Get-Queue-and-Save request the entry read from the Queue 114 is saved in location of Storage specified by the Save Address, unless the Save Address is equal to zero. The control signals generated in the save/clear Save Address Phase 716 are collectively shown as Line 718. After the Save Address Phase 716 is complete, a control Signal 720 is generated to indicate that Storage Control 110 may accept the next request for processing.

The Timing Chain 702 is initiated by a start-get-cycle or start-put-cycle signal which is provided on Line 722. FIG. 12 assumes that function decode logic (not shown) performs the necessary decoding of the Function Code specified in the request 152 or 154 and generates the Start Get/Put signal on Line 722 for the designated function and activates either the Get Cycle signal 724 or the Put Cycle signal 726.

FIG. 12 will now be described in terms of the logic affected during each of the Phases 704, 708, 712, and 716. The Read Queue Control Word signals provided on Line 706 are routed to OR Gate 732, Encode Logic 734, OR Gate 736, AND Gate 738, and AND Gate 740.

OR Gate 732 generates a read signal which sets Flip-flop 742 if the Read Queue Control Word signal is active on Line 706. The output signal from Flip-flop 742 is routed to Storage 108 via Line 536. The Encode Logic generates Address Mux 522 control signals on Line 526 to select the Address Register 514 as the location in Storage 108 to read if the Read Queue Control Word signal on Line 706 is active. The load Data Save Register 540 signal on Line 544 is made active by OR Gate 736 to receive the Queue Control Word read from Storage if the read Queue Control Word signal is active on Line 706. For a Put request 152 the Write Pointer in the Queue Control Word may need to be incremented. Therefore, if the Read Queue Control Word signal is active on Line 706 and the Put Cycle signal is active on Line 726, AND Gate 740 activates signal 564 so that the Write Pointer may be incremented by Write Pointer Increment logic 550. Similarly for a Get request 154 the Read Pointer may need to be incremented. Thus, if the read Queue Control Word signal is active on Line 706 and the Get Cycle signal is active on Line 724, AND Gate 738 activates signal 562 so that the Read Pointer Increment Logic 548 will increment the Read Pointer.

The Write Queue Control Word 132 signals are provided on Line 710 to AND Gate 746, Encode Logic 734, and Encode Logic 748. The output of AND Gate 746 depends on the Write Queue Control Word signal 710 and the Control Flags signal 558. Both signals must be active in order for the Queue Control Word to be written back to Storage 108. If the Queue 114 is full and a Put request 152 is in process, Empty/Full Logic 546 deactivates the Control Flags signal 558 thereby deactivating the output of AND Gate 746 whereby the Queue Control Word in Storage is not updated. If the output of AND Gate 746 is active, OR Gate 747 will activate its output thereby resetting Flip-flop 742 and indicating via Line 536 a write operation to Storage 108.

When the Write Queue Control Word signal 710 is active, Encode Logic generates the control signals on Line 526 which cause Address Mux 522 to select the Queue Address in the Address Register 514 as the location in Storage 108 at which the updated Queue Control Word is written. Encode Logic 748 is also responsive to write Queue Control Word Signal 710 and generates control signals on Line 534 which are routed to Data Mux 530 to select the output signals from Empty/Full Logic 546, Read Pointer Increment logic 548, and Write Pointer Increment logic 550 to use as the updated Queue Control Word to write to Storage.

The Access Queue control signal is routed via Line 714 to AND Gate 752, AND Gate 754, AND Gate 756, and OR Gate 736. The output signal from AND Gate 752 is routed to OR Gate 732 and Encode Logic 734 via Line 758 to indicate whether the Queue 114 entry referenced by the Read Pointer should be read. The resultant signal on Line 758 is active when both the Access Queue Signal 714 and the Get Cycle Signal 724 are active. An active output of AND Gate 752 to OR Gate 732 results in an active read signal from OR Gate 732, and an active output of AND Gate 752 to Encode Logic 734 specifies that the Read Pointer which is output from Read Pointer Increment logic 548 is to be used as the address in Storage 108 at which a Queue entry is to be read. As with the Write Pointer, the Read Pointer is maintained as an offset from Queue Address.

If the Access Queue Signal 714 and the Put Cycle Signal on Line 726 are active, the output of AND Gate 754, which is routed to AND Gate 760 and to Encode Logic 734 via Line 762, is activated. If the output from AND Gate 752 is active and the Control Flags signal on Line 558 is active (the Queue is neither empty nor full), the output of AND Gate 760 is activated thereby causing Flip-flop 742 to reset. The reset Flip-flop indicates to Storage 108 that a write operation i to be performed. The active output from AND Gate 754 on Line 762 also causes Encode Logic 734 to generate control signals on Line 526 for selecting the Write Pointer as the location in Storage at which to write a Queue 114 entry.

The output of AND Gate 756 is driven by the Access Queue signal on Line 714 and the Put Cycle signal on Line 726. The output signal from AND Gate 756 is routed to Encode Logic 748 via Line 764. The active output of AND Gate 756 causes Encode Logic 748 to generate the required signals for selecting the Data-in Register 518 as the input data to write to Storage 108.

When the Access Queue signal on Line 714 is active, the output signal from OR Gate 736 is activated so that the Data Save Register is enabled to accept data read from Storage 108.

The Save/Clear Save Address signal is routed via Line 718 from Phase 716 of Timing Chain 702 to Encode Logic 734, AND Gate 765, AND Gate 766, and AND Gate 768. If Encode Logic 734 detects an active signal on Line 718, it generates the control signals required to select the contents of the Save Address Register 516 as the location at which to write data. If the Save Address in the Save Address Register is equal to zero, then no saving or clearing of Storage 108 is performed. If the Non-zero Save Address signal on Line 769 is active, the output of AND Gate 765 is activated and the Storage location at Save Address is updated. An inactive Non-zero Save Address signal on Line 769 indicates that the specified Save Address in the request 152 or 154 is zero and no saving or clearing of Storage occurs.

If the Save/Clear Save Address signal on Line 718 and the Put Cycle signal on Line 726 are active, the output of AND Gate 766 is activated and routed to Encode Logic 748 via Line 770. Upon detecting an active signal Line 770, Encode Logic 748 generates the control signals required to select the zeros input Line 580 to Data Mux 530.

If the Save/Clear Save Address signal on Line 718 and the Get Cycle signal on Line 724 are active, the output of AND Gate 768 is activated and routed to Encode Logic 748 via Line 772. Upon detecting an active signal Line 772, Encode Logic 748 generates the control signals required to select the contents of the Data Save Register 540 at Data Mux 530.

Having described the preferred embodiment of the invention in the drawings and accompanying description, those skilled in the art will recognize that various modifications to the exemplary embodiment could be made without departing from the scope and spirit of the claims set forth below:

That which is claimed is:

1. A high performance recoverable queuing system comprising:
   an addressable memory capable of storing a queue;
   storage control coupled to said addressable memory for providing access to said addressable memory;
   a first processor coupled to said storage control capable of generating get-queue requests to dequeue items from said queue and processing said items received from said get-queue requests;
   a second processor coupled to said storage control capable of generating put-queue requests to enqueue items in said queue, wherein a put-queue request indicates an item to put in said queue;
   said storage control further comprising queue control responsive to said get-queue requests from said first processor and said put-queue requests from said second processor;
   wherein,
   said get-queue request includes a save-address; and
   said queue control further comprises save means responsive to said save-address for saving an item, after said item is dequeued from said queue, at a location in said addressable memory specified by said save-address, whereby items removed from said queue are recoverable.

2. The system of claim 1, further including a third processor coupled to said storage control, wherein said third processor includes
   detection means for detecting whether said first processor has failed; and
   recovery means responsive to said detection means for reading the queue item stored at said save-address associated with said first processor and completing processing of said queue item.

3. The system of claim 1, wherein
   each said get-queue request includes a queue-address selected by said first processor, wherein said queue-address indicates the first addressable location in said addressable memory allocated for storage of said queue;
   said queue includes a queue-control-word containing a read-pointer and a write-pointer, wherein said read-pointer references an address in said addressable memory from which a queue item will be read in response to a get-queue request, and said write-pointer references an address in said addressable memory at which a queue item will be written in response to a put-queue request
   said queue control further includes
   get queue means responsive to said queue address for reading said queue control word;
   control word update means for updating said queue control word; and
   put queue means responsive to said put-queue request for writing said item from said put-queue request in said queue at said write-pointer.

4. A high performance fault tolerant queuing system comprising:
   an interprocessor communication network;
   a first processor coupled to said interprocessor communication network, wherein said first processor generates a get-queue request to dequeue an item from a queue, processes said item received from said get-queue request, said get-queue request including a first processor save-address;
   a secured processor coupled to said interprocessor communication network, wherein said second processor generates a get-queue request to dequeue an item from said queue, processes said item received from said get-queue request, said get-queue request including a second processor save-address;
   put means coupled to said interprocessor communication network for generating put-queue requests to enqueue items in said queue;
   an addressable memory, wherein said queue is stored in said addressable memory; storage control coupled to said interprocessor communication network and interfaced with said addressable memory for providing access to said addressable memory for said first processor, said second processor, and said put means;

wherein said storage control includes queue control responsive to said get-queue requests, said put-queue requests;

wherein said queue control includes
- save means responsive to a get-queue request for saving an item, after said item is dequeued from said queue, at a save-address specified in said get-queue request, whereby items removed from said queue are recoverable; and wherein said first processor includes
- first detection means for detecting whether said second processor has stopped processing; and
- first recovery means responsive to said first detection means for reading a queue item stored at a save-address associated with said second processor and completing processing of said queue item stored at said save-address associated with said second processor.

5. The system of claim 4, wherein said second processor includes:
- second detection means for detecting whether said first processor has stopped processing; and
- second recovery means responsive to said second detection means for reading a queue item stored at a save-address associated with said first processor and completing processing of said queue item stored at said save-address associated with said first processor.

6. The system of claim 5, wherein each said get-queue request includes a queue-address selected by said first processor, wherein said queue-address indicates the first addressable location in said addressable memory allocated for storage of said queue;

said queue includes a queue-control-word containing a read-pointer and a write-pointer, wherein said read-pointer references an address in said addressable memory from which a queue item will be read in response to a get-queue request, and said write-pointer references an address in said addressable memory at which a queue item will be written in response to a put-queue request said queue control further includes
- get queue means responsive to said queue address for reading said queue control word;
- control word update means for updating said queue control word; and
- put queue means responsive to said put-queue request for writing said item from said put-queue request in said queue at said write-pointer.

7. The system of claim 4, wherein each said get-queue request includes a queue-address selected by said first processor, wherein said queue-address indicates the first addressable location in said addressable memory allocated for storage of said queue;

a queue includes a queue-control-word containing a read-pointer and a write-pointer, wherein said read-pointer references an address in said addressable memory from which a queue item will be read in response to a get-queue request, and said write-pointer references an address in said addressable memory at which a queue item will be written in response to a put-queue request said queue control further includes
- get queue means responsive to said queue address for reading said queue control word;
- control word update means for updating said queue control word; and
- put queue means responsive to said put-queue request for writing said item from said put-queue request in said queue at said write-pointer.

8. A high performance fault tolerant queuing system comprising:

an interprocessor communication network;

a first processor coupled to said interprocessor communication network, wherein said first processor generates a get-queue request to dequeue an item from a first queue, processes said item received from said get-queue request, said get-queue request including a first processor save-address, and generates a put-queue-and-clear request to put an item in a second queue when processing of said item from said first queue is complete and to clear the location in said addressable memory specified by said first processor save-address;

a second processor coupled to said interprocessor communication network, wherein said second processor generates a get-queue request to dequeue an item from said first queue, processes said item received from said get-queue request, said get-queue request including a second processor save-address, and generates a put-queue-and-clear request to put an item in said second queue when processing of said item from said first queue is complete and to clear the location in said addressable memory specified by said second processor save-address;

put generating means coupled to said interprocessor communication network for generating put-queue requests to enqueue items in said first queue;

get generating means coupled to said interprocessor communication network for generating get-queue requests to dequeue items from said second queue;

an addressable memory, wherein said first queue and said second queue are stored in said addressable memory;

storage control coupled to said interprocessor communication network and interfaced with said addressable memory for providing access to said addressable memory for said first processor, said second processor, said put generating means and said get generating means;

wherein said storage control includes queue control responsive to said get-queue requests, said put-queue requests, and said put-queue-and-clear requests;

wherein said queue control includes
- save means responsive to a get-queue request for saving an item dequeued from said first queue or said second queue at a save-address specified in said get-queue request; and
- clear means responsive to a put-queue-and-clear request for clearing the location in said addressable memory specified by said put-queue-and-clear request;

wherein said first processor includes
- first detection means for detecting whether said second processor has stopped processing;
- first recovery means responsive to said first detection means for reading a queue item stored at a save-address associated with said second processor and completing processing of said queue item stored at said save-address associated with said second processor;

wherein said second processor includes
    second detection means for detecting whether said first processor has stopped processing; and
    second recovery means responsive to said second detection means for reading a queue item stored at a save-address associated with said first processor and completing processing of said queue item stored at said save-address associated with said first processor.

9. The system of claim 8, wherein
    each said get-queue request includes a selectable queue-address, wherein said queue-address indicates the first addressable location in said addressable memory allocated for storage of said first queue or said second queue;
    said first queue and said second queue each include a queue-control-word containing a read-pointer and a write-pointer, wherein said read-pointer references an address in said addressable memory from which a queue item will be read in response to a get-queue request, and said write-pointer references an address in said addressable memory at which a queue item will be written in response to a put-queue request
    said queue control further includes
        get queue means responsive to said queue address for reading said queue control word;
        control word update means for updating said queue control word; and
        put queue means responsive to said put-queue request for writing said item from said put-queue request in said queue at said write-pointer.

10. In a storage system which provides storage for multiple processors, wherein the storage system includes storage control for receiving and decoding storage access requests, an addressable memory, and a memory interface for reading data from and writing data to the addressable memory, wherein each of the multiple processors gets items from or puts items in one or more shared queues stored in the addressable memory, a method for maintaining a plurality of queues that are shared between the multiple processors comprising the steps of:
    (a) putting items in one of the plurality of queues;
    (b) sending a get-queue-and-save request from a first processor to the storage controller to get an item from said one of the plurality of queues; performing steps (c) through (e) at said storage controller;
    (c) getting an item from said one of the plurality of queues;
    (d) saving said item from said getting step in a predetermined location in the addressable memory; and
    (e) sending said item from said getting step to said first processor.

11. The method of claim 10, further including the steps of:
    (f) sending a put-queue-and-clear request from said first processor to said storage controller to put an item in a second one of the plurality of queues; performing steps (g) through (h) at said storage controller;
    (g) putting said item from said put-queue-and-clear request in said second one of the plurality of queues; and
    (h) clearing said predetermined location in the addressable memory.

12. In a storage system which provides storage for multiple processors, wherein the storage system includes storage control for receiving and decoding storage access requests, an addressable memory, and a memory interface for reading data from and writing data to the addressable memory, wherein each of the multiple processors gets items from or puts items in one or more shared queues stored in the addressable memory, a method for maintaining a plurality of queues that are shared between the multiple processors comprising the steps of:
    performing steps (a) through (b) in a first processor;
    (a) selecting one of the plurality of queues in which to put an item;
    (b) sending a put-queue request to the storage controller to put an item in the queue ID from said selecting step (a);
    performing steps (c) through (e) at said storage controller;
    (c) obtaining a write-pointer which is associated with the queue specified in said put-queue request;
    (d) putting said item in the queue at the location the addressable memory referenced by said write-pointer;
    (e) updating said write-pointer;
    performing steps (f) through (g) in a second processor;
    (f) selecting one of the plurality of queues from which to get an item;
    (g) sending a get-queue request to the storage controller to get an item from the queue from said selecting step (f);
    performing stops (h) through (j) at said storage controller;
    (h) obtaining a read-pointer which is associated with the queue specified in said get-queue request;
    (i) getting an item from the queue from the location in the addressable memory referenced by said mad-pointer; and
    (j) sending said queue item from said getting step (i) to said second processor.

13. The method of claim 12, wherein
    said put-queue request includes a queue-address which references a location in the addressable memory at which storage for said queue from said selecting step (a) is allocated;
    said obtaining step (c) further includes the step of reading said write-pointer from the addressable memory;
    said get-queue request includes a queue-address which references a location in the addressable memory at which storage for said queue from said selecting step (f) is allocated;
    said obtaining step (h) further includes the step of reading said read-pointer from the addressable memory;
    the storage controller further performs step (k) in processing a put-request;
    (k) writing said write-pointer back to the addressable memory; and
    the storage controller further performs step (l) in processing a get-queue request;
    (l) writing said read-pointer back to the addressable memory.

14. The method of claim 12, wherein said storage controller further performs the steps of:
    accepting another queue request after processing of said put-request is complete; and
    accepting another queue request after processing of said get-request is complete.

15. The method of claim 12,
    wherein said get-queue request includes a save-address; and
    the storage controller further performs the step of saving said queue item from said getting step (j) at the location in said addressable memory indicated by said save-address.

16. The method of claim 15, wherein said save-address in said get-queue request is optionally specified by the second processor and said saving step is optionally performed by said storage controller depending upon whether said save-address was specified.

17. In a storage system which provides storage for multiple processors, wherein the storage system includes storage control for receiving and decoding storage access requests, an addressable memory, and a memory interface for reading data from and writing data to the addressable memory, wherein each of the multiple processors gets items from or puts items in one or more shared queues stored in the addressable memory, a method for maintaining a plurality of queues that are shared between the multiple processors comprising the steps of:

performing steps (a) through (b) in a first processor;

(a) selecting a first queue in which to put a queue item;

(b) sending a put-queue request to a storage controller to put an item in said fist queue;

performing step (c) at said storage controller;

(c) putting said queue item in said first queue;

performing steps (d) through (e) in a second processor;

(d) selecting said first queue for getting a queue item;

(e) sending a get-queue-and-save request to said storage controller to get a queue item from said first queue, wherein said get-queue-and-save request includes a save-address;

performing steps (f) through (h) at said storage controller;

(f) getting a queue item from said queue;

(g) sending said queue item from said getting step (f) to said second processor;

(h) saving said queue item from said getting step (f) at the location in said addressable memory indicated by said save-address from said get-queue-and-save request;

performing steps (i) through (k) in the second processor;

(i) processing the queue item received in response to said get-queue-and-save request;

(j) selecting a second queue for putting a queue item;

(k) sending a put-queue-and-clear request to said storage controller to put the queue item from said selecting step (j) in said second queue, wherein said put-queue-and-clear request includes a save-address to indicate the location in the addressable memory to be cleared;

performing steps (l) through (m) at said storage controller;

(l) putting the queue item from said put-queue-and-clear request in said second queue; and (m) clearing the location in the addressable memory specified by said put-queue-and-clear request.

18. The method of claim 17 wherein said second processor optionally specifies a clear function in said put-queue-and-clear request and said storage controller performs said clearing step (m) only if said clear function is specified.

19. A high performance queuing system comprising:

an addressable memory;

storage control coupled to said addressable memory for providing access to said addressable memory;

a first processor coupled to said storage control, wherein said first processor generates get-queue requests to dequeue items from a queue stored in said addressable memory and processes said items received from said get-queue requests;

a second processor coupled to said storage control, wherein said second processor generates put-queue requests to enqueue items in said queue, wherein a put-queue request indicates an item to put in said queue;

wherein said storage control further includes queue control responsive to said get-queue requests from said first processor and said put-queue requests from said second processor; wherein, each said get-queue request includes a queue-address selected by said first processor, wherein said queue-address indicates the first addressable location in said addressable memory allocated for storage of said queue;

said queue includes a queue-control-word containing a read-pointer and a write-pointer, wherein said mad-pointer references an address in said addressable memory from which a queue item will be read in response to a get-queue request, and said write-pointer references an address in said addressable memory at which a queue item will be written in response to a put-queue request said queue control further includes get queue means responsive to said queue address for reading said queue control word;

control word update means for updating said queue control word; and put queue means responsive to said put-queue request for writing said item from said put-queue request in said queue at said write-pointer.

20. The system of claim 19, wherein:

said get-queue request includes a save-address; and said queue control further includes save means responsive to said save-address for saving an item dequeued from said queue at a location in said addressable memory specified by said address.

21. A high performance recoverable queuing system comprising:

an addressable memory having storage control for providing access to said addressable memory;

a first processor coupled to said storage control, wherein said first processor generates get-queue requests to dequeue items from a queue stored in said addressable memory and processes said items received from said get-queue requests;

a second processor coupled to said storage control, wherein said second processor generates put-queue requests to enqueue items in said queue, wherein a put-queue request indicates an item to put in said queue;

queue control within said storage control and responsive to said get-queue requests from said first processor and said put-queue requests from said second processor; and save control within said queue control and responsive to said get-queue requests, wherein said save control saves an item, after said item is dequeued from said queue, whereby items removed from said queue are recoverable.

22. The queuing system of claim 21, wherein said addressable memory includes a save-area that is addressable by said save control for storing said item dequeued from the said queue and which is associated with said first processor.

23. The queuing system of claim 22, wherein said get-queue request includes a save-address that is used by said save control to address said save-area.

24. The queueing system of claim 21, further including
a third processor coupled to said storage control, wherein said third processor includes
  detection means for detecting whether said first processor has failed; and
  recovery means responsive to said detection means for reading said item saved by said save control and completing processing of said queue item.

25. The queueing system of claim 22, further including
a third processor coupled to said storage control, wherein said third processor includes
  detection means for detecting whether said first processor has failed; and
  recovery means responsive to said detection means for reading said item saved by said save control and completing processing of said queue item.

26. A high performance recoverable queuing system for use in a data processing system having an addressable memory capable of storing one or more queues of data, one or more processors, each capable of generating queue-read signals and queue-write signals for reading data from and writing data to the queues, the queue-read signals comprising mad-address signals anti the queue-write signals comprising write-address signals, where the read-address signals and write-address signals are of a referenced queue, the queuing system comprising:
  a queue control logic circuit coupled to the processors for receiving the queue-read signals and queue-write signals, and coupled to the addressable memory for reading data from and writing data to the queues stored in the addressable memory in response to the queue-read signals and queue write signals;
  said queue control logic circuit comprising
    a read-queue logic circuit responsive to the read-address signals for reading queue data from the referenced queue;
    a save-control logic circuit coupled to the addressable memory for receiving queue data read from the referenced queue in response to the read-address signals and for writing the queue data back the addressable memory at a selectable address, whereby acknowledgment between the processors and the queue control logic circuit is unnecessary, and the data read from the queue is recoverable; and
    a write-queue logic circuit responsive to the write-address signals for writing queue data to the referenced queue.

27. The queuing system of claim 26, wherein the queue-read signals further include save-address signals that specify an address in the addressable memory for storing queue data after the data has been read,
  wherein said save-control logic circuit is responsive to said save-address signals, whereby queue data read from the referenced queue is stored back in the addressable memory at the address specified by the save-address signals, and a processor generating queue-read signals is capable of selectably specifying an address in the addressable memory for storing the data read from the referenced queue.

28. The queuing system of claim 27, wherein the queue-write signals further include clear-address signals that specify an address in the addressable memory be cleared,
  wherein said write-queue logic circuit further comprises a clear-control logic circuit that is responsive to said clear-address signals, whereby after queue data is written to the referenced queue the address specified by the clear-address signals is written with predetermined data, thereby indicating that the address specified by the clear-address signals no longer contains recoverable data previously read from a queue.

* * * * *